(12) United States Patent
Ganapathi et al.

(10) Patent No.: US 10,873,864 B2
(45) Date of Patent: *Dec. 22, 2020

(54) INCORPORATION OF EXPERT KNOWLEDGE INTO MACHINE LEARNING BASED WIRELESS OPTIMIZATION FRAMEWORK

(71) Applicant: salesforce.com, inc., San Francisco, CA (US)

(72) Inventors: Tejaswini Ganapathi, San Francisco, CA (US); Satish Raghunath, Sunnyvale, CA (US); Shauli Gal, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,632

(22) Filed: Jul. 15, 2019

(65) Prior Publication Data
US 2019/0342770 A1 Nov. 7, 2019

Related U.S. Application Data

(63) Continuation of application No. 15/803,557, filed on Nov. 3, 2017, now Pat. No. 10,448,267.

(51) Int. Cl.
*H04W 24/02* (2009.01)
*H04W 24/08* (2009.01)
(Continued)

(52) U.S. Cl.
CPC ............ *H04W 24/02* (2013.01); *G06N 5/003* (2013.01); *G06N 7/005* (2013.01); *G06N 20/00* (2019.01);
(Continued)

(58) Field of Classification Search
CPC . H04L 41/0823; H04L 41/0893; H04L 41/14; H04L 69/16; H04W 24/02;
(Continued)

(56) References Cited

U.S. PATENT DOCUMENTS 8,175,986 B2   5/2012  Machulsky et al.
8,219,606 B2 * 7/2012  Morris .................... H04L 69/16
                                                       709/201

(Continued)

OTHER PUBLICATIONS

U.S. Appl. No. 15/803,557, Non-Final Office Action dated Mar. 19, 2019.
(Continued)

*Primary Examiner* — Alpus Hsu
(74) *Attorney, Agent, or Firm* — Wong & Rees LLP; Zhichong Gu

(57) ABSTRACT

Based on expert input comprising recommended parameter values, a machine learning framework is constrained to perform machine learning to estimate optimal parameter values for TCP parameters in specific regions of an output parameter space. Network traffic data associated with a plurality of data requests to one or more computer applications are collected, over a time block, based on sampled parameter values for the TCP parameters. The sampled parameter values are distributed within the specific regions of the output parameter space. The machine learning is used to estimate the optimal parameter values for the TCP parameters. The optimal parameter values, for the TCP parameters, are propagated to and used by user devices to make new data requests to the computer applications.

20 Claims, 10 Drawing Sheets

(51) Int. Cl.
*H04L 12/24* (2006.01)
*H04L 29/06* (2006.01)
*G06N 20/00* (2019.01)
*G06N 5/00* (2006.01)
*G06N 7/00* (2006.01)

(52) U.S. Cl.
CPC ...... *H04L 41/0823* (2013.01); *H04L 41/0893* (2013.01); *H04L 41/14* (2013.01); *H04L 69/16* (2013.01); *H04W 24/08* (2013.01)

(58) Field of Classification Search
CPC ....... H04W 24/08; G06N 5/003; G06N 7/005; G06N 20/00
See application file for complete search history.

(56) References Cited

U.S. PATENT DOCUMENTS

| | | | |
|---|---|---|---|
| 8,396,582 B2* | 3/2013 | Kaushal | G05B 13/0265 700/104 |
| 8,407,171 B2 | 3/2013 | Gupta et al. | |
| 8,762,309 B2 | 6/2014 | Machulsky et al. | |
| 9,160,810 B2* | 10/2015 | Luxenberg | G06F 9/45558 |
| 9,495,647 B2 | 11/2016 | Zhao et al. | |
| 9,521,158 B2 | 12/2016 | Pietro et al. | |
| 9,654,341 B2* | 5/2017 | Valluri | H04L 1/0026 |
| 9,684,865 B1 | 6/2017 | Ezick et al. | |
| 9,836,696 B2 | 12/2017 | Vasseur et al. | |
| 9,843,488 B2 | 12/2017 | Balabine et al. | |
| 9,870,537 B2 | 1/2018 | Vasseur et al. | |
| 9,886,670 B2* | 2/2018 | Dirac | G06N 20/00 |
| 10,102,480 B2* | 10/2018 | Dirac | G06N 20/00 |
| 10,223,169 B2* | 3/2019 | Kelly | G06F 9/5072 |
| 10,318,881 B2* | 6/2019 | Rose | G06N 20/00 |
| 10,366,053 B1* | 7/2019 | Zheng | G06F 16/137 |
| 10,382,490 B2* | 8/2019 | Kassimis | H04L 67/42 |
| 10,581,680 B2* | 3/2020 | Freimuth | H04L 41/0826 |
| 2017/0147722 A1 | 5/2017 | Greenwood | |
| 2017/0261949 A1 | 9/2017 | Hoffmann et al. | |
| 2018/0212959 A1 | 7/2018 | Mukherjee et al. | |
| 2018/0278486 A1 | 9/2018 | Mermoud et al. | |
| 2018/0331908 A1* | 11/2018 | Gal | H04L 69/16 |
| 2018/0365581 A1 | 12/2018 | Vasseur et al. | |
| 2018/0367428 A1 | 12/2018 | Pietro et al. | |
| 2019/0141542 A1 | 5/2019 | Ganapathi et al. | |

OTHER PUBLICATIONS

U.S. Appl. No. 15/803,557, Notice of Allowance dated Jun. 7, 2019.

* cited by examiner 442 through 448 of FIG. 4D verify the best parameter values, for the network parameters in the set of network parameters, by comparing to parameter values determined from a black box optimization 450

FIG. 4E

INCORPORATION OF EXPERT KNOWLEDGE INTO MACHINE LEARNING BASED WIRELESS OPTIMIZATION FRAMEWORK

CROSS-REFERENCE TO RELATED APPLICATIONS

This application is a Continuation of U.S. patent application Ser. No. 15/803,557 filed on Nov. 3, 2017, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to optimizing network policies in content delivery, and in particular, to incorporation of expert knowledge into machine learning based wireless optimization framework.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

Techniques that rely on compression or right-sizing content do not address the fundamental issues of network volatility and diversity as they impact the transport of data. Irrespective of the savings in compression, the data still has to weather the vagaries of the network, operating environment, and end device.

Transmission Control Protocol (TCP) plays an important role in the content delivery business: it provides a reliable, ordered, and error-checked delivery of a stream of octets between applications running on hosts communicating by an IP network. Major Internet applications, such as the World Wide Web, email, remote administration, and file transfer, rely on TCP. Numerous parameters may be used in TCP to help in ordered data transfer, retransmission of lost packets, error-free data transfer, flow control, and congestion control. However, identifying optimal data values for TCP parameters based on changing network characteristics remains a challenge.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4D and FIG. 4E illustrate example computer implemented methods.

DESCRIPTION OF EXAMPLE EMBODIMENTS

Figure 1:
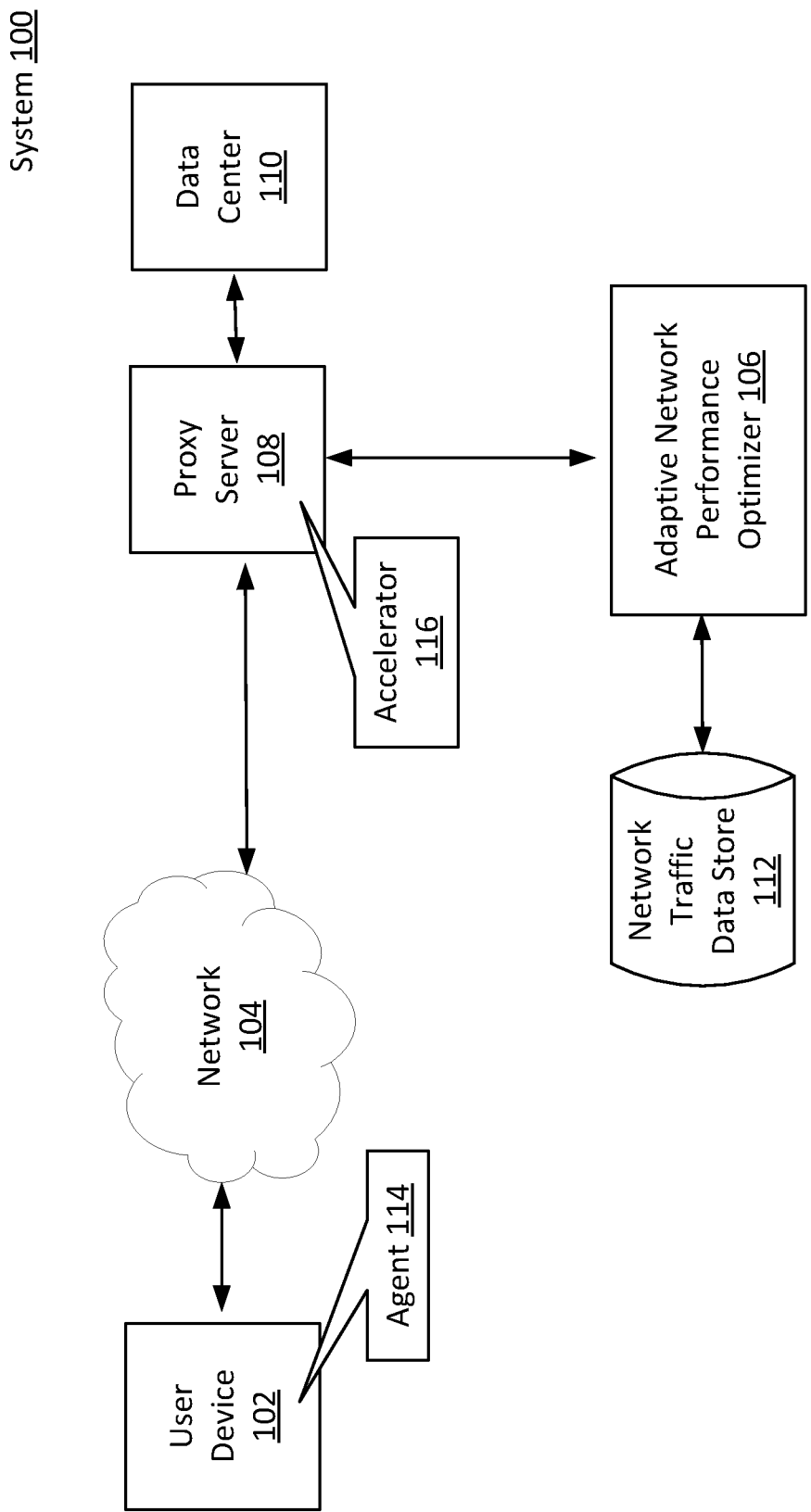
FIG. 1 illustrates a high-level block diagram, according to an embodiment of the invention.

Example embodiments, which relate to incorporation of expert knowledge into machine learning based wireless optimization framework, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. GENERATING ADAPTIVE LEARNING DATASETS
3. ESTIMATING PARAMETERS USING ADAPTIVE LEARNING DATASETS
4. EXPERT INPUT FOR OUTPUT NETWORK PARAMETERS
5. INCORPORATING EXPERT INPUT FOR EFFICIENT MACHINE LEARNING
6. CONVERGENCE ON OPTIMUM NETWORK PARAMETERS
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include cellular networks (e.g., LTE, HSPA, 3G, older technologies, etc.), Wi-Fi (e.g., 802.11xx series of standards, etc.), satellite, microwave, etc. In terms of devices and software, there are smartphones, tablets, personal computers, network-connected appliances, electronics, etc., that rely on a range of embedded software systems such as Apple iOS, Google Android, Linux, and several other specialized operating systems. There are certain shared characteristics that impact data delivery performance:

a. Many of these network technologies feature a volatile wireless last mile. The volatility manifests itself in the application layer in the form of variable bandwidth, latency, jitter, loss rates and other network related impairments.
 b. The diversity in devices, operating system software and form factors results in a unique challenge from the perspective of user experience.
 c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to optimize data delivery. To maximize improvement in throughput gain and download complete time, network parameters (or TCP parameters) may be estimated using a data driven approach by analyzing prior wireless network traffic data. Because wireless networks are volatile and non-stationary (i.e., statistics change with time), estimating network parameters (or TCP parameters) poses several challenges. The estimate should be adaptive to capture volatilities in the wireless network, but also stable and not overly sensitive to short term fluctuations. Further, raw network traffic data does not capture the performance in improvement of throughput and download complete time of a particular set of network parameters (or TCP parameters). Methods and techniques described herein adaptively estimates network parameters (or TCP parameters) by developing algorithms that operate on past data.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Generating Adaptive Learning Datasets

The performance of data delivery is closely tied to the operating conditions within which the end-device is operating. With ubiquitous wireless access over cellular and Wi-Fi networks, there is a lot of volatility in operating conditions, so acceleration techniques must adapt to such a network by adapting to these conditions, e.g., the performance achievable over a private Wi-Fi hotspot is very different from that with a cellular data connection. An accelerator 116, as illustrated in FIG. 1, dynamically adapts to these conditions and picks the best strategies based on the context.

The context captures the information about the operating conditions in which data transfer requests are being made. This includes, but not limited to, any combination of:
 Type of device, e.g., iPhone, iPad, Blackberry, etc.
  This may also include the version of the device and manufacturer information.
 Device characteristics, e.g., the type of its modem, CPU/GPU, encryption hardware, battery, NFC (Near Field Communication) chipset, memory size and type or any other hardware information that impacts performance.
 Mobility of device, e.g., whether the device is on a moving vehicle/train etc., or is stationary/semi-stationary.
 Operating System on the device.
 Operating System characteristics, e.g., buffering, timers, public and hidden operating system facilities (APIs), etc.
  This may also include operating system limitations such as number of simultaneous connections allowed to a single domain, etc.
 Usage information related to various device elements, e.g., Memory, Storage, CPU/GPU etc.
 Battery charge and mode of powering the device.
 Time of day.
 Location where available.
 IP Address and port numbers.
 Network type, e.g., Wi-Fi or Cellular, or 3G/4G/LTE, etc., or Public/Home Wi-Fi, etc.
  SSID (Service Set Identifier) in Wi-Fi networks.
  802.11 network type for Wi-Fi networks.
 Service Provider information, e.g., AT&T or Verizon for cellular, Time Warner or Comcast for Wi-Fi, etc.
 Strength of signal from the access point (e.g., Wi-Fi hot spot, cellular tower, etc.) for both upstream and downstream direction.
 Cell-Tower or Hot-Spot identifier in any form.
 Number of sectors in the cell tower or hot spot.
 Spectrum allocated to each cell tower and/or sector.
 Any software or hardware limitation placed on the hotspot/cell tower.
 Any information on the network elements in the path of traffic from device to the content server.
 Firewall Policy rules, if available.
 Any active measurements on the device, e.g., techniques that measure one-way delay between web-server and device, bandwidth, jitter, etc.

Medium of request, e.g., native app, hybrid app, web-browser, etc.
  Other information describing the medium, e.g., web browser type (e.g., Safari, Chrome, Firefox etc.), application name, etc.
Any other third party software that is installed on the device which impacts data delivery performance.
Content Type, e.g., image, video, text, email, etc.
  Also includes the nature of content if it is dynamic or static.
Content Location, e.g., coming from origin server or being served from a CDN (Content Delivery Network).
  In the case of a CDN, any optimization strategies being employed, if available.
Recent device performance statistics, e.g., dropped packets, bytes transferred, connections initiated, persistent/on-going connections, active memory, hard disk space available, etc.
Caching strategies if any, that are available or in use on the device or by the application requesting the content.
In the case of content, where multiple objects have to be fetched to completely display the content, the order in which requests are placed and the order in which objects are delivered to the device. The request method for each of these objects is also of interest.

Based on the operating context, a cognitive engine may be able to recommend, but is not limited to, any combination of: end-device based data delivery strategies and accelerator-based data delivery strategies.

End-device based data delivery strategies refer to methods deployed by an application (an application could be natively running on the end-device operating system, or running in some form of a hybrid or embedded environment, e.g., within a browser, etc.) to request, receive or, transmit data over the network. These data delivery strategies include, but are not limited to, any combination of:
  Methods used to query the location of service point, e.g., DNS, etc.
    This may involve strategies that include, but are not limited to, any combination of: choosing the best DNS servers based on response times, DNS prefetching, DNS refreshing/caching, etc.
  Protocols available for data transport, e.g., UDP, TCP, SCTP, RDP, ROHC, etc.
  Methods to request or send data as provided by the operating system, e.g., sockets, CFHTTP or NSURL-Connection in Apple's iOS, HttpUrlConnection in Google's Android, etc.
  Session oriented protocols available for requests, e.g., HTTP, HTTPS, FTP, RTP, Telnet, etc.
  Full duplex communication over data transport protocols, e.g., SPDY, Websockets, etc.
  Caching and or storage support provided in the Operating System.
  Compression, right sizing or other support in the devices to help reduce size of data communication.
  Transaction priorities which outline the order in which network transactions to be completed:
    E.g., this may be a list of transactions where the priority scheme is simply a random ordering of objects to be downloaded.
  Content specific data delivery mechanisms, e.g., HTTP Live Streaming, DASH, Multicast, etc.
  Encryption support in the device:
    Also includes secure transport mechanisms, e.g., SSL, TLS, etc.
  VPN (Virtual Private Network) of any kind where available and/or configured on the device.
  Any tunneling protocol support available or in use on the device.
  Ability to use or influence rules on the device which dictate how the data needs to be accessed or requested or delivered.
    This includes, but is not limited to, any combination of: firewall rules, policies configured to reduce data usage, etc.
  Ability to pick the radio technology to use to get/send data. For example, if allowed, the ability to choose cellular network to get some data instead of using a public Wi-Fi network.
  Ability to run data requests or process data in the background.
  Threading, locking, and queuing support in the Operating System.
  Ability to modify radio power if available.
  Presence and/or availability of any error correction scheme in the device.
  In cases where middle boxes in the network infrastructure have adverse impact on performance, capabilities on the end-device to deploy mitigations such as encrypted network layer streams (e.g. IPSec, etc.).

A range of parameters determines the performance of tasks such as data delivery. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Pat. No. 9,544,205 B2, entitled "Cognitive Data Delivery Optimizing System," filed Nov. 12, 2013; U.S. Pat. No. 10,205,634 B2, entitled "Adaptive Multi-Phase Network Policy Optimization," filed May 12, 2017, the entire contents of which are hereby incorporated by reference in its entirety for all purposes. Embodiments are not tied down by assumptions on the current nature of the system. An adaptive network performance optimizer 106 may use raw network traffic data to generate an adaptive learning dataset.

FIG. 1 and the other figures use like reference numerals to identify like elements. A letter after a reference numeral, such as "102*a*," indicates that the text refers specifically to the element having that particular reference numeral. A reference numeral in the text without a following letter, such as "102," refers to any or all of the elements in the figures bearing that reference numeral (e.g. "102" in the text refers to reference numerals "102*a*," and/or "102*b*" in the figures). Only one user device 102 (end-devices as described above) is shown in FIG. 1 in order to simplify and clarify the description.

As illustrated in FIG. 1, a system 100 includes a user device 102 that communicates data requests through a network 104. A proxy server 108 may receive the data requests and communicate the requests to a data center 110. An adaptive network performance optimizer 106 may gather information from the proxy server 108 and store information in a network traffic data store 112, in an embodiment. For example, with a priori knowledge of the possible parameter space of the network parameters (or TCP parameters), a range of values in the space may be set for each network parameter (or each TCP parameter). Then, over time, mobile network traffic may be assigned parameters from this space at random and performance data may be stored in the network traffic data store 112. The mobile network traffic data (e.g., the assigned parameters, the performance data, etc.) may be stored as static policy data in the network traffic data store 112. A subset of the traffic may be performed with default network parameters (or default TCP parameters) of the carrier and data about that traffic may be stored as bypass traffic data. Example carriers may include, but are not necessarily limited to, Verizon, AT&T, T-Mobile, Sprint, etc.; each carrier may have respective default network parameters (or default TCP parameters) for those user devices that subscribe to, or operate with, communication services (e.g., wireless data services, Wi-Fi services, etc.) of each such carrier.

Each database record in the network traffic data store 112 may include performance metrics comparing the static policy data against the bypass traffic data. For example, data representing outcomes of the download such as the throughput, download complete time, and time to first byte, may be captured in each database record in the network traffic data store 112 for each static policy. Performance metrics such as percentage improvement in throughput and download complete time of the policy applied compared to the bypass traffic may also be stored in the network traffic data store 112, in one embodiment.

Other information may also be included in each database record, in other embodiments. Typical sources of data relating to the network environment are elements in the network infrastructure that gather statistics about transit traffic and user devices that connect to the network as clients or servers. The data that can be gathered includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, a component may be installed in the user device 102 (agent 114) that provides inputs about the real-time operating conditions, participates and performs active network measurements, and executes recommended strategies. The agent 114 may be supplied in a software development kit (SDK) and is installed on the user device 102 when an application (e.g., a mobile app, etc.) that includes the SDK is installed on the user device 102. By inserting an agent 114 in the user device 102 to report the observed networking conditions back to the accelerator 116, estimates about the state of the network can be vastly improved. The main benefits of having a presence (the agent 114) on the user device 102 include the ability to perform measurements that characterize one leg of the session, e.g., measuring just the client-to-server leg latency, etc.

An accelerator 116 sits in the path of the data traffic within a proxy server 108 and executes recommended strategies in addition to gathering and measuring network-related information in real-time. The accelerator 116 may propagate network policies (e.g., TCP policies, etc.) from the adaptive network performance optimizer 106 to the proxy server 108, in one embodiment. In another embodiment, the agent 114 may implement one or more network policies (e.g., TCP policies, etc.) from the adaptive network performance optimizer 106. For example, the optimal number of simultaneous network connections may be propagated as a network policy (e.g., a TCP policy, etc.) from the adaptive network performance optimizer 106 through the network 104 to the agent 114 embedded on the user device 102. As another example, the transmission rate of file transfer may be limited to 20 MB/sec by the accelerator 116 as a network policy (e.g., a TCP policy, etc.) propagated by the adaptive network performance optimizer 106 based on supervised learning and performance metrics. Here, the term "supervised learning" is defined as providing datasets to train a machine to get desired outputs as opposed to "unsupervised learning" where no datasets are provided and data is clustered into classes.

Once a multitude of raw network traffic data associated with data requests between user devices 102 and the data centers 110 are logged in the network traffic data store 112, it becomes possible to aggregate this data by static policy and time block into database records (or aggregated rows). For example, this aggregation may record outcomes of the download, such as the throughput, download complete time, and time to first byte, as a moving average over 24 hours. A moving average increases the number of data requests (e.g., download requests, network requests, etc.) used to calculate the average statistic, increasing its statistical significance and adds additional data to the adaptive learning system. Aggregated data in each database record also records performance metrics such as percentage improvement in throughput and download complete time of the policy applied in comparison to the bypass traffic.

3. Estimating Parameters Using Adaptive Learning Datasets

Figure 2A:
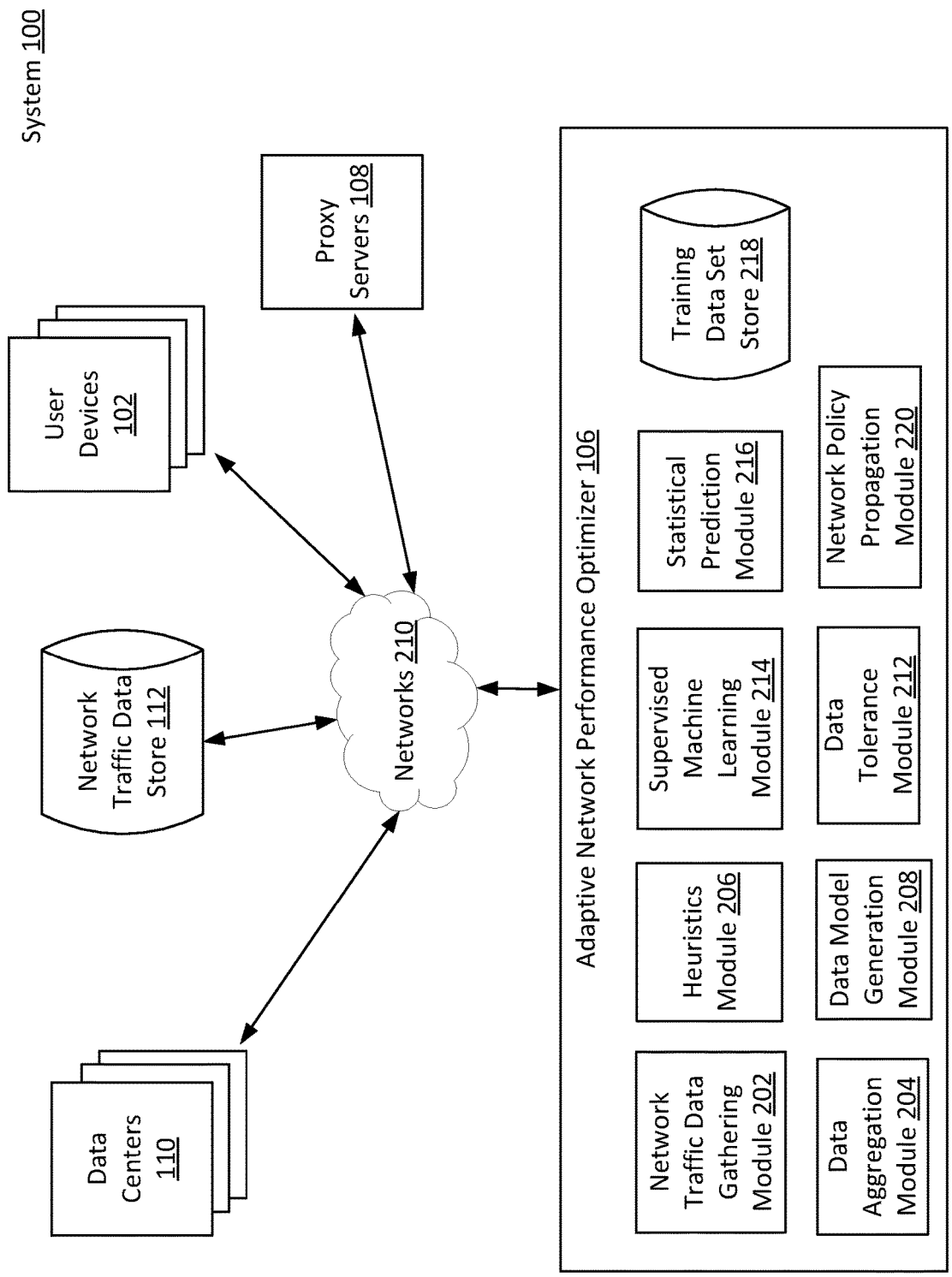
FIG. 2A illustrates a high-level block diagram, including an example adaptive network performance optimizer according to an embodiment of the invention.

FIG. 2A illustrates a high-level block diagram, including an example adaptive network performance optimizer, according to an embodiment. An adaptive network performance optimizer 106 may include a network traffic data gatherer 202, a data aggregator 204, a heuristics engine 206, a data model generator 208, a data tolerance adjustor 212, a supervised machine learning trainer 214, a statistical prediction generator 216, a training data set store 218, and a network policy propagator 220, in one embodiment. The adaptive network performance optimizer 106 may communicate data over one or more networks 210 with other elements of system 100, such as user devices 102, one or more proxy servers 108, data centers 110, and one or more network traffic data stores 112.

A network traffic data gatherer 202 may read, from a network traffic data store 112, one or more network data values associated with data requests between user devices 102 and data centers 110 through one or more proxy servers 108. In one embodiment, a network data value may be gathered by an agent 114 of a user device 102 or from a proxy server 108. The network traffic data gatherer 202 may retrieve network traffic data stored in one or more network traffic data stores 112 by the agent 114 or by the proxy server 108, in an embodiment.

A data aggregator 204 may aggregate data values over a fixed period of time (e.g., a month, a week, a day, etc.) for each combination of static policy and time block into database records (or aggregated rows). A particular combination of static policy and time block may be referred to herein as a control field. Each aggregated row becomes a data point with information on the "goodness" of the network parameters (or the TCP parameters) used. Further, the distribution of control field values in this data set is representative of the mobile network traffic that is aimed for optimization. Every network parameter (or every TCP parameter) can be modeled as an inverse problem: a function of the download outcomes. For example, a moving average of the download complete time values for a particular combination of a static policy and a time block may be identified as the lowest (e.g., the fastest, etc.) download complete time across all time blocks. As a result, the particular combination of static policy and time block may be a good estimate of the best value for the network parameter (or the TCP parameter). This good estimate of the best value for the network parameter (or the TCP parameter) may be used as a set of data points on which a machine may be trained in a "supervised" way, further described below as supervised learning method 400, in one embodiment.

A heuristics engine 206 may incorporate knowledge known to administrators of the adaptive network performance optimizer 106. A heuristic is a technique, method, or set of rules designed for solving a problem more quickly when classic methods are too slow, or for finding an approximate solution when classic methods fail to find any exact solution. Here, the heuristics engine 206 may incorporate knowledge known to the designers of the supervised learning method and techniques described herein to estimate network parameters (or TCP parameters), such as supervised learning method 400 below. For example, a particular carrier, such as AT&T, may have a maximum throughput of 50 MB/sec based on historical data. Thus, a transmission rate, a particular network parameter (or a particular TCP parameter), may be throttled to a range of 20 to 30 MB/sec to ensure faster transmission and minimize the risk of packet loss.

A data model generator 208 may generate one or more data models to estimate network parameters (or TCP parameters) as described above. Given the possibility of network changes over time and the deterministic nature of identifying optimal network parameter values (or optimal TCP parameter values) using static policies and time blocks, the data model generator 208 may be used to identify an iterative process for a supervised learning algorithm, or method 400, to train a machine to achieve desired outputs. Here, the estimation of the best value of a single (network or TCP) parameter given the control fields using the performance information in the data points follows a two-step Bayesian learning algorithm. First, the estimation of the best value is based on a generative module where the parameter is an inverse function of the download outcomes such as throughput, time to first byte, and download complete time. A prediction algorithm is used to estimate the optimal value of this parameter. In order to estimate a value close to optimum that works well in practice, the data points are weighted by a function of their performance information and the traffic share associated with the particular aggregation. In this way, a set of data points may be generated to train the machine as a result of the supervised learning algorithm, or method 400.

After the best value of a single parameter is estimated based on a model generated by the data model generator 208, the posteriori probability of good performance is measured conditioned on the parameter estimate and other TCP and network parameters. For example, if the posteriori probability is high, the optimizer 106 may then choose this policy for use on future network traffic. This probability is estimated using information from other estimated or set network parameters (or other estimated or set TCP parameters) hence taking into account possible dependencies using a statistical prediction generator 216, for example. For multiple parameter estimation, this process is either parallelized if the parameters are independent in probability distribution or the estimation of the parameters is performed in cascade (e.g., ordered by respective sensitivity of the parameters to download outcomes, etc.) if independence cannot be determined. A supervised machine learning trainer 214 may iterate this two-step Bayesian learning algorithm using the generated datasets described above, stored in a training data set store 218.

A data tolerance adjustor 212 may ensure that an estimated parameter falls within a particular tolerance based on the type of parameter. For discrete network parameter values (or TCP parameter values), such as number of simultaneous network connections, the tolerance may be zero (0), for example. For continuous network parameter values (or TCP parameter values), such as rate of transmission, the tolerance may be 10%, for example, in comparison with a black box optimization algorithm developed to retrieve network parameters (or TCP parameters) which maximized performance based on calculation of network statistics. The objective function of the black box optimization is a function of performance improvement in throughput and download complete time, network congestion, and other network parameters. The optimization is constrained on thresholds for performance improvement metrics and traffic share. The black box algorithm outputs a set of network parameters (or TCP parameters) which optimizes the objective function subject to the constraints. The algorithm operates on data aggregated over some period of time (e.g., a few days, etc.) and has no memory in the choice of statistics used to calculate this objective function and is purely deterministic.

In order to constrain the parameter space and generate relevant data sets to train the data model on, the black box algorithm and the generation of static policies may be used in tandem by a supervised machine learning trainer 214 over multiple (e.g., learning, etc.) iterations. This gives the learning framework its adaptive nature. The static policies ensure that the adaptive learning framework explores the entire network parameter space (the entire TCP parameter space) and does not lead to focusing on local optima. The black box optimization algorithm guides the learning framework to focus on parts of the parameter space where performance improvements are likely to result. Because the learning algorithm has memory and is used in tandem with the above elements, the network parameter estimates (or TCP parameter estimates) have achieved a tradeoff between maximizing performance improvement over bypass traffic and generating stable estimates that do not fluctuate with short term network fluctuations, while enabling estimates to evolve over time.

A statistical prediction generator 216 may be used to generate calculations used in statistical prediction, including probability distributions, Bayesian probability, moving averages, regression analysis, predictive modeling, and other statistical computations. A training data set store 218 may be used to store training set data for generated data models, as described above. The training data set store 218 may include a subset of data stored on the network traffic data store 112, in one embodiment.

A network policy propagator 220 may deliver a network policy to user devices 102 and/or proxy servers 108. A network policy may be chosen based on the above described techniques and may be propagated by configuring a network interface on the user device 102 through an agent 114 or configuring network traffic management on a proxy server 108 through an accelerator 116, in an embodiment. In other embodiments, the network policy propagator 220 may send instructions to a user device 102 or a proxy server 108 on how to implement the chosen network policy based on the estimated network (or TCP) parameter.

4. Expert Input for Output Network Parameters

In a machine learning framework such as an adaptive multi-phase supervised machine learning framework for wireless network optimization as described in the previously mentioned U.S. Pat. No. 10,205,634 B2, an output parameter space comprising possible values for network or TCP parameters can be randomly sampled/selected among all the possible values. The randomly sampled values for the network or TCP parameters may be incorporated into static policies for processing data requests (e.g., network requests, download requests, etc.) from user devices. Network traffic data may be collected for these data requests, as well as for other data requests that are handled with default parameter values supplied by carriers. The network traffic data may be used in the machine learning framework to generate or estimate optimal values for the network or TCP parameters by taking into account impacts from a wide variety of data request related factors such as autonomous system number, device type, content size, content type, application server, data center, varying locations of computer applications, geography, network type, etc. The estimated optimal values may be incorporated into network or TCP strategies for processing future data requests to maximize download outcomes, mobile app performance for end users, and so forth.

Under other approaches, an (e.g., entire, etc.) output parameter space may be randomly explored without a priori knowledge. Network performance details may need to be collected for numerous different combinations of values for network or TCP parameters represented in the output parameter space. Numerous probing network or TCP strategies (e.g., static policies, etc.) with the numerous different combinations of values for the network or TCP parameters have to be exercised on relatively large amounts of live traffic to collect the network performance details. In addition, due to the large amounts of the network performance details, a machine learning framework under these other approaches may have to undergo many iterations or recursions in order to converge to optimal parameter values, if it is at all possible to converge within the parameter space comprising so many different combinations of possible values for the network or TCP parameters.

In contrast, techniques as described herein can be used to incorporate domain knowledge and expert intuition (e.g., from human experts, etc.) into a machine learning framework to constrain estimated optimal values of network or TCP parameters in specific regions in an (output) parameter space, thereby speeding up convergence of the machine learning framework to optimal network or TCP strategies. The domain knowledge and expert intuition can be dynamically and adaptively incorporated into the machine learning framework or machine learning methods/algorithms therein in a wide range of operational scenarios to estimate optimal parameter values for network or TCP parameters in a computationally efficient and expeditious manner.

These techniques can integrate domain knowledge and expert intuition, including but not limited to even relatively minor or minimal domain knowledge and intuition, into the machine learning framework or the machine learning methods/algorithms performed therein. The integration of some or all of the domain knowledge and expert intuition may occur at runtime or at the beginning of an individual learning iteration. The domain knowledge and expert intuition does not have to be precise; but can be used as a constraint to guide the evolution of network or TCP strategies over one or more iterations to optimal solution(s) for one or more network(s) over a lesser number of iterations.

The domain knowledge and expert intuition need not be incorporated a priori into a machine learning framework while the machine learning framework was being developed or before the machine learning framework is deployed in the field in a production system. At runtime, expert input representing the domain knowledge, expert intuition, and so forth, can be provided to the machine learning framework to constrain parameter values in the learning iteration to recommended values, recommended value ranges, recommended parameter relationships, recommended conditions, and so forth, for any in a wide variety of network or TCP parameters. By way of example but not limitation, the expert input may be provided as dynamically configurable or reconfigurable expert intuition/input through configuration files that are read by the machine learning framework at the beginning of each learning iteration.

The domain knowledge and expert intuition augments the machine learning framework and helps the machine learning framework to converge estimated optimal parameter values for network or TCP parameters converge to the recommended values, the recommended value ranges, the recommended parameter relationships, the recommended conditions, and so forth, relatively fast with a relatively high confidence of network performance improvement.

Additionally, optionally or alternatively, these techniques can be extended to other (e.g., existing, newly developed, etc.) machine learning frameworks other than the adaptive multi-phase supervised machine learning framework for wireless network optimization as described in the previously mentioned U.S. Pat. No. 10,205,634 B2.

By way of example but not limitation, domain knowledge and expert intuition may be applied to recommend network or TCP strategies for a set of network or TCP parameters such as total numbers of concurrent connections, congestion control, timeouts, and so forth. The set of network or TCP parameters may represent some or all network or TCP parameters to be optimized under a machine learning framework.

In some embodiments, the machine learning framework uses a data matrix generated per learning iteration from network traffic data to generate different customized network or TCP strategies/policies for different data request segments in a data request space representing all possible data requests. The data request space refers to a space (e.g., a data matrix space, etc.) of all possible/available values of all (data request related) fields represented in matrix rows of the data matrix. A data request segment refers to a data segment or a subdivision—of the data request space—representing all (e.g., possible, logged, to be processed, etc.) data requests that share the same values for some or all fields represented in matrix rows of the data matrix. Examples of represented fields in the data matrix may include, but are not necessarily limited to only, any of: autonomous system number (ASN), carrier, time zone, phone operating system (OS), and other variables that are a function of networks and device, geography, network type (e.g., Wi-Fi, cellular, 3G, 4G, LTE, AT&T, Verizon, T-Mobile, Sprint, etc.), computer application (e.g., mobile application name or type, computer application name or type, etc.), etc.

Data request segments in the data request space can be identified as scopes and/or sub scopes. A data request scope (or "scope" for simplicity) refers to a data request segment indexed or parameterized by a set of scope-level fields (or factors) selected from the represented fields in the data matrix. A data request sub scope (or "sub scope" for simplicity) refers to a data request segment that is a subdivision of a scope. The sub scope may be indexed or parameterized by the set of scope level fields plus at least one additional (sub-scope-level) field (or factor)—which is selected from the represented fields in the data matrix—other than the scope-level fields.

Scopes and/or sub scopes can be identified iteratively over each of multiple time blocks (e.g., running time blocks, etc.). Example time blocks may include but are not necessarily limited to, every two to six hours, every n number of hours, every day, every fraction of a day, every week, every fraction of a week, etc. A customized network policy for an identified scope and/or sub scope can be generated/outputted as a specific machine learning solution for the scope and/or sub scope.

For example, a customized network policy for a data request segment may be derived or generated by a Bayesian learning module. Optimal values for network or TCP parameters in the customized network or TCP policy can be generated by the Bayesian learning module trained by matrix rows in the data request segment that show performance improvements over baseline performance generated by default network policies.

Various methods of optimizing data delivery for scopes and/or sub scope are described in U.S. patent application Ser. No. 15/803,624, with an application title of "DYNAMIC SEGMENT GENERATION FOR DATA-DRIVEN NETWORK OPTIMIZATIONS," by Tejaswini Ganapathi, Satish Raghunath, Shauli Gal, Kartikeya Chandrayana and Steve Wilburn, filed Nov. 3, 2017, 2017; U.S. patent application Ser. No. 15/803,614, with an application title of "SIMULTANEOUS OPTIMIZATION OF MULTIPLE TCP PARAMETERS TO IMPROVE DOWNLOAD OUTCOMES FOR NETWORK-BASED MOBILE APPLICATIONS," by Tejaswini Ganapathi, Satish Raghunath, Kartikeya Chandrayana and Shauli Gal, filed Nov. 3, 2017, 2017, the entire contents of which are hereby incorporated by reference in its entirety for all purposes.

Figure 3:
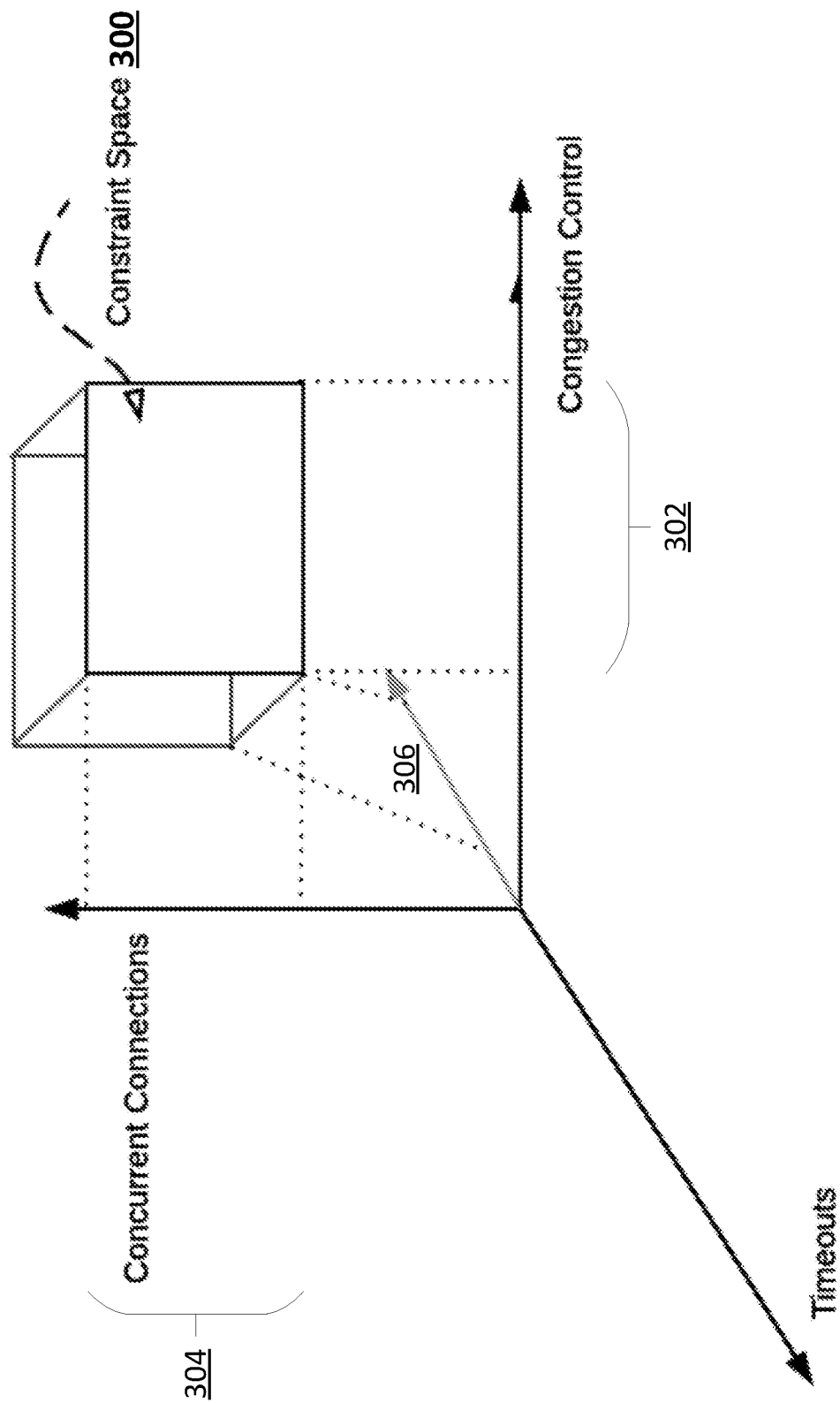
FIG. 3 illustrates an exploration or constraint space constructed or identified based on expert input, according to an embodiment of the invention.

FIG. 3 illustrates an exploration or constraint space 300 constructed or identified based on expert input representing domain knowledge, expert intuition, and so forth. Each network or TCP parameter in the set of network or TCP parameters is represented in a coordinate system as a dimension. A complete coordinate space represented by the coordinate system may comprise all possible parameter values for each of the dimensions of the coordinate system. Exploration of all possible parameter values of all dimensions can lead to relatively long converging time, relatively high computation cost and complexity, and even suboptimal solutions depending on functional forms and models used in the machine learning framework.

Different expert input can be used to recommend different values, different value ranges, different parameter relationships, different conditions, and so forth, for different data request segments such as scopes and/or sub scopes. For example, the expert input can be used to recommend specific values, specific value ranges, specific parameter relationships, specific conditions, and so forth, for network or TCP parameters for handling new or future data request that share data request related fields represented in a given scope.

The expert input may be used to identify the given scope, for example by one or more selected scope-level data request related fields such as {computer application (e.g., corresponding CDN, mobile app, etc.), geography (e.g., US West 4, etc.), network type (e.g., Wi-Fi, LTE, etc)}. For the given scope that is indexed or parameterized by the scope-level data request related fields, the expert input may also define a first acceptable set 302 of parameter values for a first parameter "congestion control"; a second acceptable set 304 of parameter values for a second parameter "concurrent connections" (or a total number of concurrent connections); and a third acceptable set 306 of parameter values (e.g., 200 milliseconds, 500 milliseconds, etc.) for a third parameter "timeouts". Some or all of the acceptable sets of parameter values can be provided based on high level broad domain knowledge and expert intuition as opposed to precise knowledge, and represent value scopes in which the best values should be explored.

A variety of constructs may be generated to represent the specific values, specific value ranges, specific parameter relationships, specific conditions, and so forth, for the network or TCP parameters as recommended by experts, in the coordinate system of FIG. 3. For instance, given the scope and the expert input, the machine learning framework may generate or construct a constraint space 300 such as one or more polytopes and so forth in the network or TCP parameter space of FIG. 3. This constraint space 300 serves as a constraint set within which the machine learning framework operates. In some embodiments, even with only broad value ranges and minor or minimal expert input, a constraint space (e.g., 300) that is much smaller (e.g., ten times, four times, three times, etc.) than the entire network or TCP parameter space can be generated or constructed for locating or learning the best values of the network or TCP parameters, thereby achieving significant improvement in computer application (e.g., mobile app, etc.) performance.

Figure 2B:
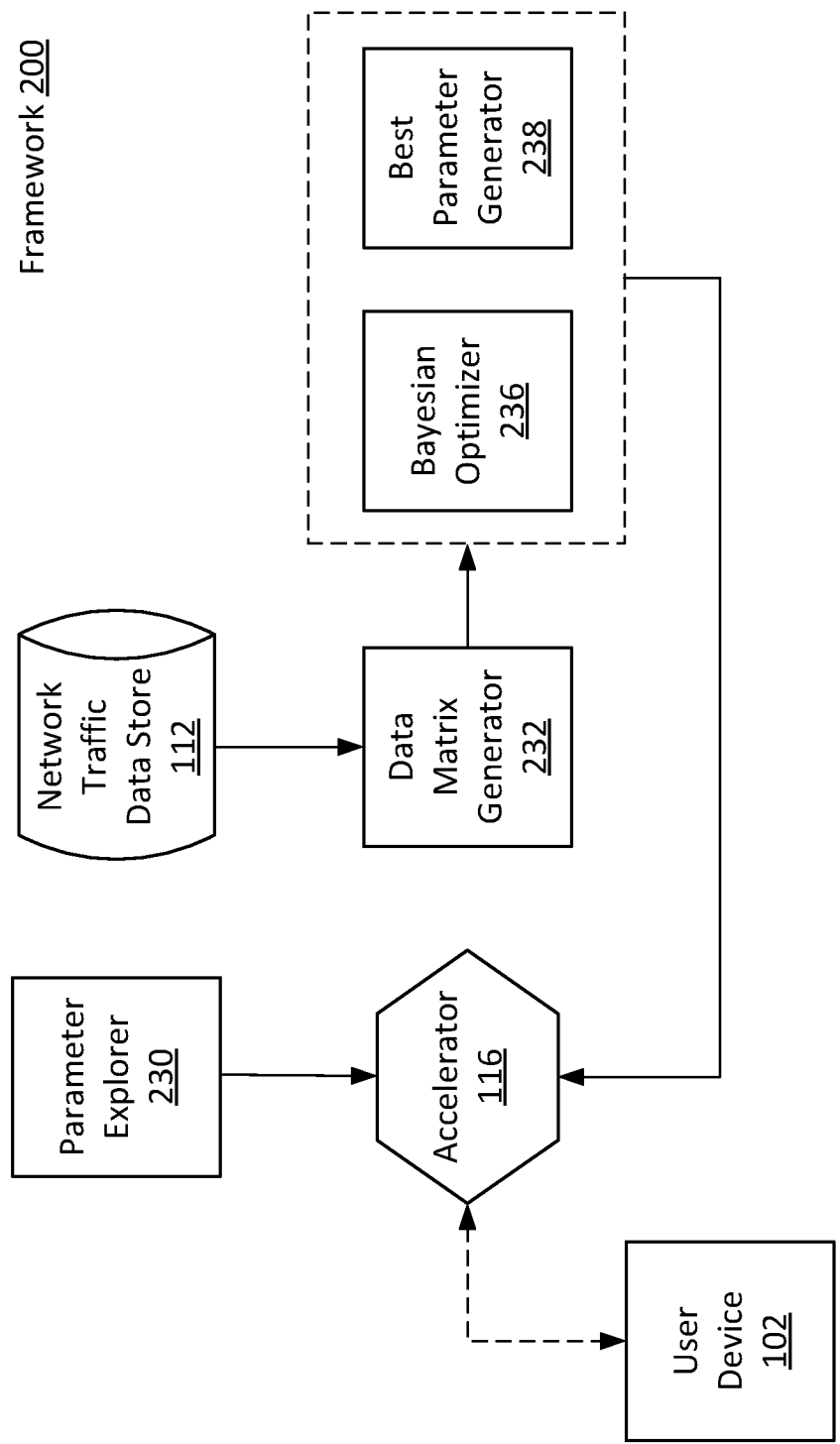
FIG. 2B illustrates a high-level block diagram, including an example adaptive network policy generation framework that incorporates (e.g., human, etc.) experts' domain knowledge and intuition, according to an embodiment.

FIG. 2B illustrates a high-level block diagram, including an example adaptive network policy generation framework 200 that incorporates (e.g., human, etc.) experts' domain knowledge and intuition, according to an embodiment. An adaptive network policy generation framework 200 may be implemented by one or more computing devices including but not necessarily limited to the adaptive network performance optimizer 106 of FIG. 1 or FIG. 2A. As illustrated in FIG. 2B, the adaptive network policy generation framework 200 may include a parameter explorer 230, an accelerator 116, a network traffic data store 112, a data matrix generator 232, a Bayesian optimizer 236, a best parameter generator 238, etc.

Any of these elements in the framework 200 may have a single running instance, or multiple running instances, and may communicate data over one or more networks 210 with other elements of framework 200 and/or system 100, such as user devices 102, one or more proxy servers 108, data centers 110, and so forth.

Based on expert representing the domain knowledge and expert intuition, the parameter explorer 230 may construct or generate a polytope in a possible parameter space or (an output parameter space) of network or TCP parameters. The polytope represents a subset of possible parameter values in the possible parameter space.

To collect network traffic data to be used for optimizing network parameters that may be included in customized network policies, the parameter explorer 230 may generate a plurality of static policies that comprises a plurality of sets of (e.g., sampled, static, etc.) network parameter values. Each static policy in the plurality of static policies may comprise a respective set of network parameter values in the plurality of sets of network parameter values. In some embodiments, the plurality of sets of network parameter values may be selected/sampled, for example uniformly, from the polytope in the possible parameter space of the network parameters. The plurality of static policies, or the corresponding plurality of sets of network parameter values, may be propagated by the accelerator 116 (which may be deployed at a point relatively close to user devices or a portion thereof) to be used by user devices (e.g., 102, etc.) in making data requests (e.g., network requests, download requests, etc.) that share a common set of scope-level fields such as "app", "geo" and "network_type".

Over a time block (e.g., every four hours, every five hours, every n unit of time, a variable number of hours etc.), data requests respectively assigned with different sets of static policies in the plurality of static policies—or different sets of network parameter values in the plurality of sets of network parameter values—can be used to generate static policy data that comprises a plurality of static policy data portions for the plurality of sets of network parameter values. The static policy data may be in the network traffic data store 112. Bypass traffic data may also be generated with default network or TCP parameters (e.g., of the carrier, etc.) and stored in the network traffic data store 112.

The data matrix generator 232 may retrieve the static policy data and the bypass traffic data from the network traffic data store 112, and use the static policy data and the bypass traffic data to generate a data matrix. The data matrix comprises a plurality of matrix rows to be used to adaptively identify scopes and/or sub scopes and determine customized network policies/strategies for the identified scopes and/or sub scopes.

A matrix row represents a database record or an aggregated row comprising data field values directly or indirectly derived from raw network traffic data. Each matrix row in the data matrix may be a database record or an aggregated row comprising a plurality of values (for a plurality of fields) directly aggregated from raw network traffic data that logs data requests made by user devices (e.g., 102, etc.) to application servers or data centers (e.g., 110, etc.). Additionally, optionally or alternatively, each matrix row in the data matrix may be a further consolidated database record comprising a plurality of values (for a plurality of fields) aggregated from database records (or aggregated rows) that in turn are generated/aggregated from the raw network traffic data.

Each matrix row in the data matrix may store a traffic share value (e.g., an absolute value, a relatively value, a percentile value, etc.) for a respective (e.g., distinct, unique, etc.) combination of values for a combination of scope-level fields and sub-scope-level fields represented in the matrix row.

Each matrix row in the data matrix may comprise (e.g., aggregated, average, etc.) performance metrics of comparing the static policy data against the bypass traffic data with respect to one or more data requests that share a respective (e.g., distinct, unique, etc.) combination of (field) values for the combination of sub-scope-level fields represented in each such matrix row. For example, fields representing download outcomes such as throughput, download complete time, time to download the first byte, and so forth, may be captured in each matrix row in the data matrix. Each such matrix row may also comprise (e.g., static, sampled, etc.) network parameter values used to make data request(s).

Matrix rows in the data matrix for the time block (e.g., the latest time block, etc.) as generated by the data matrix generator 232 can be used to identify scopes and sub scopes for the time block. For example, a scope may be identified by a respective combination of values for the scope-level fields. In addition, traffic shares in the matrix rows in the data matrix for the time block can be used to identify one or more sub scopes for each of the identified scopes. Each of the one or more identified sub scopes may be a sub-scope-level data request segment among one or more sub-scope-level data request segments with one or more top traffic shares as determined from the traffic share values stored in the matrix rows of the data matrix.

A learning framework comprising the Bayesian optimizer 236, the best parameter generator 238, and so forth, can implement and perform an iterative supervised learning process. At each learning iteration, the Bayesian optimizer 236 estimates the best value for a network or TCP parameter based on a generative module where the parameter is an inverse function of the download outcomes such as throughput, time to first byte, and download complete time. The best parameter generator 238 may implement a black box optimization algorithm based on an objective function of performance improvement in throughput and download complete time, network congestion, and other network parameters. The back box algorithm may be performed less often than the Bayesian prediction/estimation performed by the Bayesian optimizer 236. The black box algorithm outputs a set of network or TCP parameters which optimizes the objective function subject to constraints. For example, the back box algorithm may be performed based on network traffic data underlying one or more data matrixes for one or more time blocks, based on one or more sets of network traffic data used by one or more learning iterations of the Bayesian optimizer 236, etc. The output of the black box algorithm may be used in one or more learning iterations to guide the learning framework to focus on parts of the parameter space where performance improvements are likely to result. In some embodiments, the Bayesian optimizer 236 comprises a pool or a set of Bayesian optimizer instances performing optimizing for multiple data request segments in parallel, in series, or in part parallel in part series. In some embodiments, a separate Bayesian optimizer instance may be used to optimize network policies for each of the data request segments. In some embodiments, a separate Bayesian optimizer instance may be used to optimize network policies for a specific network or TCP parameter in each of the data request segments. Likewise, in some embodiments, the best parameter generator 238 comprises a pool or a set of best parameter generator instances performing best parameter generations for multiple data request segments in parallel, in series, or in part parallel in part series. In some embodiments, a separate best parameter generator instance may be used to calculate best parameter values for each of the data request segments.

For each identified scope and/or each identified sub scope, the learning framework can generate a customized network or TCP strategy to be incorporated by a network or TCP policy for handling new requests that share the same values (or attributes) of the identified scope or sub scope. In some embodiments, such network or TCP strategy may be generated and implemented only under conditions of:
  a) adequate confidence for the strategy as measured/indicated by a posteriori probability (e.g., above a pre-configured or dynamically configured posteriori probability threshold, etc.) that the strategy leads to a performance gain, and
  b) adequate traffic for the data request segment corresponding to the sub scope, as evidenced or determined based on traffic share information stored in the data matrix.

The generated network or TCP strategy may be propagated to proxy servers (e.g., 108 of FIG. 1) or accelerators therein (e.g., 116, etc.) to be used for processing/handling new data requests for example in a subsequent time block. Some or all of estimated optimal network or TCP parameter values in the generated network strategy may be further propagated to user devices (e.g., 102, etc.) to be used for processing the new data requests (e.g., in the next time block).

Subsequent network traffic data may be collected in the subsequent time block and used to generate a subsequent data matrix and matrix rows therein. Additionally, optionally or alternatively, subsequent expert input may also be provided to the machine learning framework to be used in the subsequent learning iteration. Additionally, optionally, or alternatively, subsequent scopes and sub scopes may be identified based at least in part on the subsequent network traffic data and/or the subsequent data matrix. Subsequent customized optimization for the subsequent scopes and sub scopes may be further performed in the same manner as discussed herein.

5. Incorporating Expert Input for Efficient Machine Learning

Figure 4A:
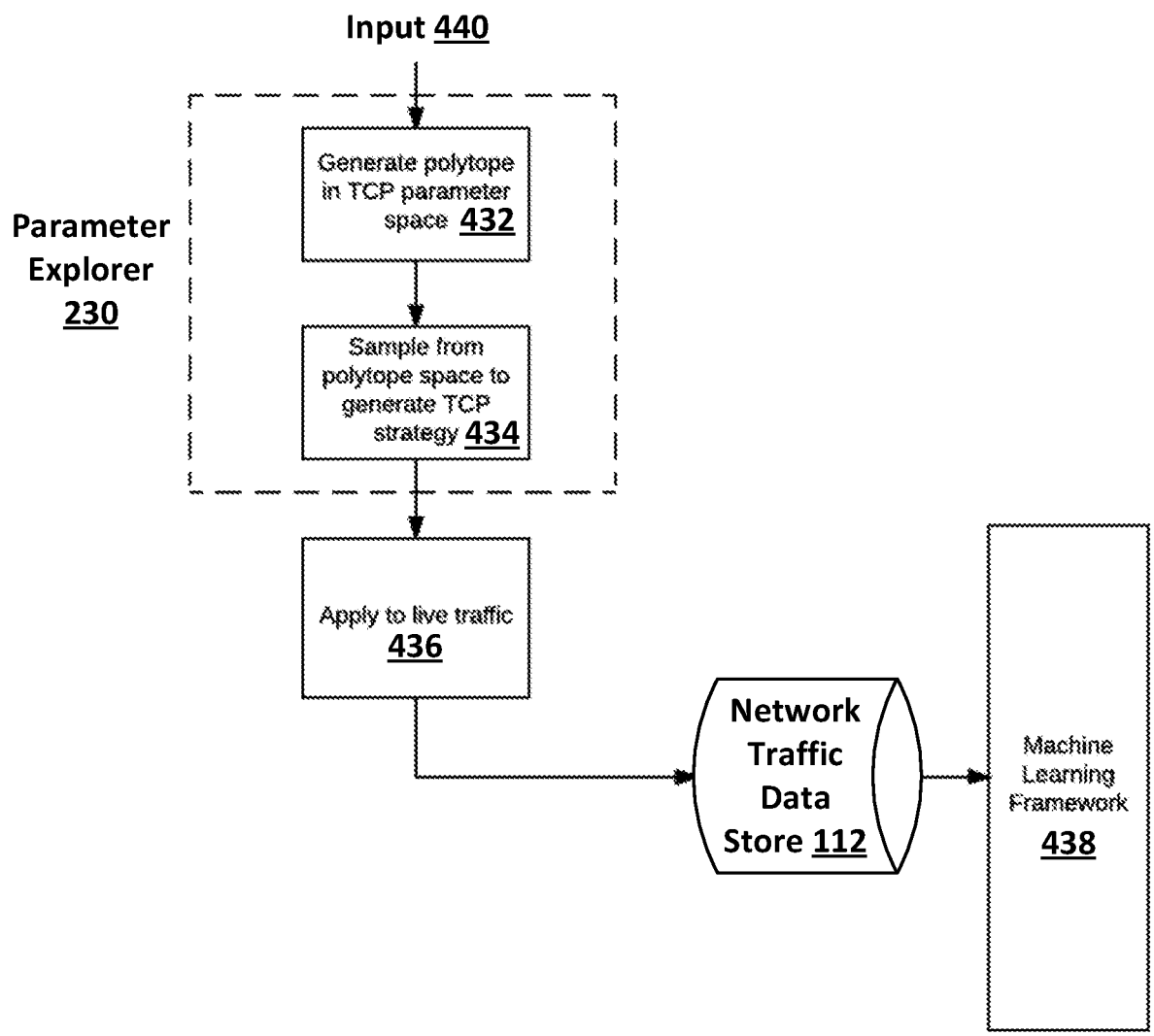
FIG. 4A illustrates a high-level diagram of a procedure for incorporating human expertise to guide a machine learning framework, according to an embodiment.

FIG. 4A illustrates a high-level diagram of a procedure for incorporating human expertise to guide a machine learning framework, according to an embodiment. The procedure may be performed by one or more computing devices including but not necessarily limited to an adaptive network performance optimizer (e.g., 106 of FIG. 1 or FIG. 2A, etc.), or a parameter explorer (e.g., 230 of FIG. 2B, etc.) therein, in one embodiment.

During a parameter exploration phase executed with a parameter explorer (e.g., 230 of FIG. 2B, etc.), a polytope is generated 432 in an output parameter space (e.g., as illustrated in FIG. 3, etc.) based on input 440 representing domain knowledge, expert intuition, and so forth. The polytope may constrain parameter values for a set of network parameters in a data request space, or a data request segment such as a scope and/or scope in the data request space. Sampling 434 is made from within this polytope to obtain static policies which are random but constrained within the polytope. These static policies are applied 436 to a relatively small fraction of synthetic traffic or even live traffic to generate, collect and provide network traffic data related to data requests made with these static policies. The network traffic data may be used to generate a data matrix used to drive one or more learning iterations performed by a machine learning framework (e.g., 438, etc.). The machine learning framework 438 uses the data matrix generated from the network traffic data applied with these static policies as collected from the synthetic or live traffic to organically learn the best parameter values of network parameters in the set of network parameters in the data request space, the scope and/or sub scope therein.

In contrast with other approaches, techniques as described herein can bring about a number of benefits including but not necessarily limited to only, any of:

a. While domain knowledge and expert intuition regarding parameter values can be provided to the machine learning framework as a constraint, there is no need for inputting precise parameter values. It is sufficient for the machine learning framework to be provided with parameter values at various levels of details and/or precisions. The expert input can be provided to the machine learning framework without needing to provide information about distributions of download outcomes in a particular network with respect to values or value ranges recommended in the expert input, as would be the case in learning scenarios of other approaches where prior probabilities are to be exploited. The expert input can be provided to the machine learning framework without needing to provide ground truths or training data about how any of the recommended values, recommended value ranges, recommended parameter relationships, recommended conditions, and so forth, in the expert input actually operate in specific networks. Under techniques as described herein, crude knowledge, minimal intuition, etc., on acceptable sets (e.g., acceptable values, acceptable value ranges, etc.) of network or TCP parameters for a variety of different network types (e.g., LTE, 3G, 4G, 5G, Wi-Fi, etc.), a variety of different computer applications, locations of different networks with different autonomous system numbers and/or application servers, and so forth, is sufficient for the learning framework to exploit the acceptable sets (e.g., acceptable values, acceptable value ranges, etc.). This approach constrains the best parameter values, the best strategies/policies, and so forth, in machine learning framework as illustrated in FIG. 2B, to scopes and value ranges set forth in the expert input in compliance with the (e.g., human, etc.) experts' domain knowledge and intuition.

b. Expert input as described herein such as value ranges used to generate polytopes in parameter spaces can be changed relatively easily anytime during an adaptive learning process even while the adaptive learning process is running. The expert input can be provided before any given learning iteration, at the beginning of the learning iteration, and/or while the learning iteration is being performed. Network or TCP strategies returned by the best policy and machine learning framework can automatically operate on or with newly provided expert input. In some embodiments, assigning larger shares of traffic to some or all parameter exploration policies in compliance with the newly provided expert input can effectively provide the machine learning framework sufficient data to learn the best policies with the newly provided expert input.

6. Convergence on Optimum Network Parameters

Figure 4B:
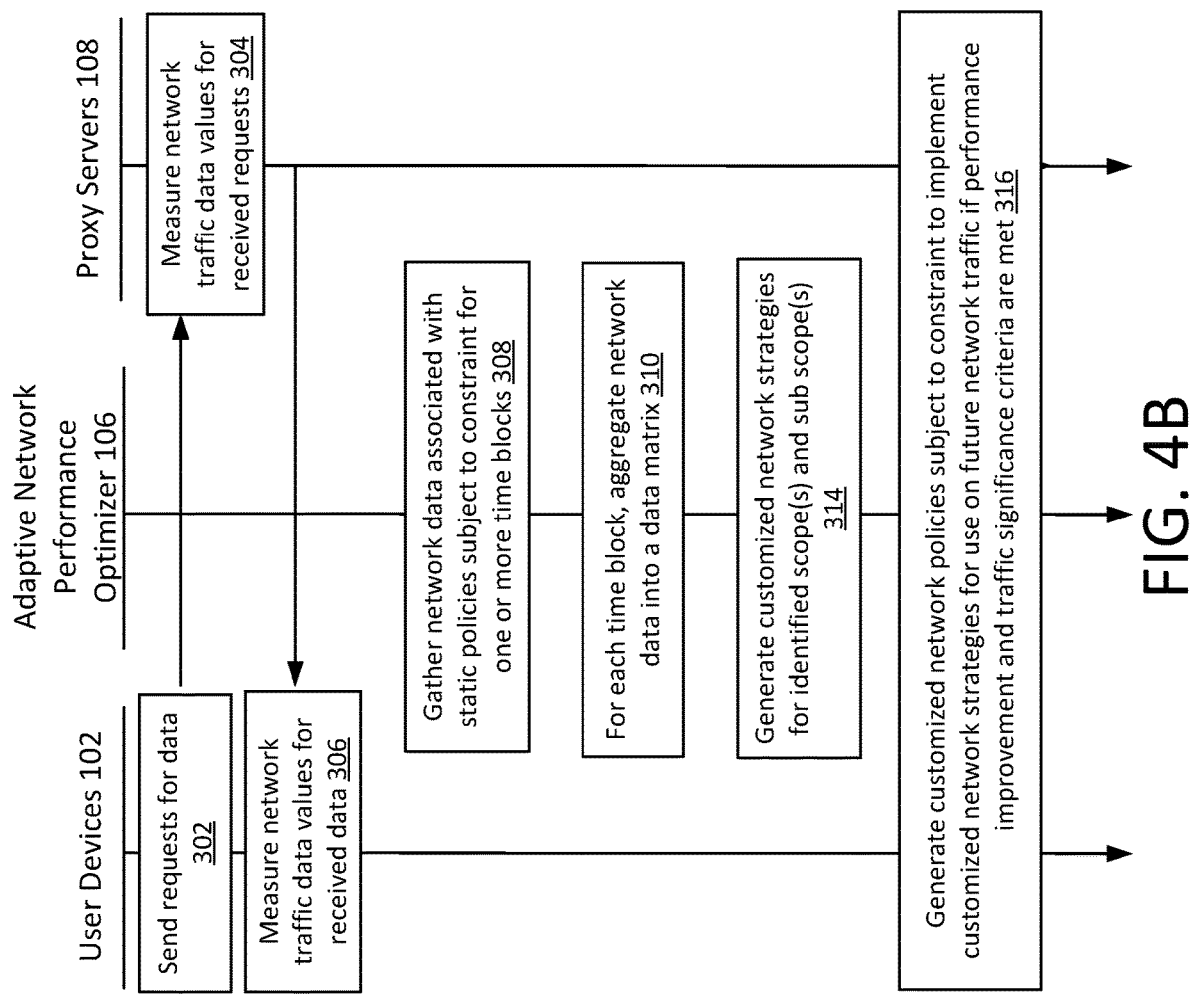
FIG. 4B illustrates a high-level interaction flow diagram of adaptive network policy optimization, according to an embodiment of the invention.

FIG. 4B illustrates a high-level interaction diagram of adaptive network policy optimization, according to an embodiment. User devices 102 may send 302 requests for data to proxy servers 108. In response, proxy servers 108 may measure 304 network traffic data values for received requests. As data is sent from proxy servers 108 to user devices 102, network traffic data values for received data may be measured 306 by user devices 102. Such raw network traffic data values may include download completion time, time to first byte, and throughput, for example.

Network data associated with static policies with parameter values (subject to a constraint to be) within the polytope may be gathered 308 for one or more time blocks. A polytope in a possible parameter space may be generated from input representing experts' domain knowledge and intuition on values, value ranges, etc., for a set of network parameters for a given scope or sub scope in a data request space. Static policies include randomly assigned or uniformly selected/sampled parameter values retrieved from the range of parameter values in the polytope. Mobile network traffic may then be assigned the static policies and data is gathered 308 by recording the network traffic data in the network traffic data store 112. A time block is a period of time during which the network traffic data is recorded in the network traffic data store 112.

For each static time block, network data values may be aggregated 310 into a data matrix. The network data values are aggregated 310 over a fixed period of time (e.g., the last month, the last week, the last day, etc.). The aggregation records outcomes of the download, such as the throughput, download complete time, and time to first byte, as a moving average over a time block. Performance metrics of policy applied compared to bypass traffic is determined for each static policy and time block, and the performance metrics are stored within each database record. Bypass traffic, as mentioned above, is a subset of traffic that is assigned default network or TCP parameters. In this way, aggregated network data values in a database record provide qualitative information about how well the static policy performed over the bypass traffic. This aggregated data set is stored as training data in the training data set store 218. In addition, the database records including traffic share information may be further aggregated into corresponding matrix rows in the data matrix.

A network or TCP strategy is generated 314 for the given scope and/or sub scope for use on future network traffic if performance improvement and traffic significance criteria are met.

A best value of a parameter may be estimated (subject to a constraint to be) within the polytope based on a weighting of the performance metrics associated with the parameter. A prediction algorithm is used to estimate the optimal value of this parameter. The estimation is based on a generative model where the network or TCP parameter is an inverse function of the download outcomes such as throughput, time to first byte and download complete time. Each database record as mentioned above provides a data point with information on the "goodness" of the network or TCP parameter used. To estimate a value close to optimum that works well in practice, the data points are weighted by a function of their performance information and the traffic share associated with the particular aggregation. Higher performing data points would be weighted more, as well as higher traffic share data points. For example, if it is determined that 25 MB per second transmission rate is high performing compared to bypass traffic, that value may be weighted more heavily than lesser performing data points. In this way, the best value of a parameter may be estimated.

A network or TCP policy as described herein may comprise estimated best parameter values for network or TCP parameters for use on future network traffic. The estimated best parameter values may be determined as matching (with a threshold or margin of tolerance) a calculated value for the parameter by a black box optimization that maximizes performance using network statistics (e.g., over a single or multiple time blocks, etc.). In this way, the approach taken by the learning algorithm is adaptive and multi-phase: phase 1 includes estimating the network or TCP parameters to estimate the best values while phase 2 uses a greedy optimization that promotes the best outcomes given network statistics. Comparing phase 1 and phase 2 may also be defined as generating a model of convergence. In one embodiment, a policy may be determined to fail because the phase 1 and phase 2 parameters do not converge. In a further embodiment, a policy may be determined to fail because a prediction model on the convergence of the phase 1 and phase 2 parameters show less than a specific (e.g., 55%, etc.) likelihood of convergence. In this case, one or more hidden variables may be affecting the policy. For example, file size may be a dominant characteristic that affects a policy that enables throughput of 1 MB to 20 MB. Because file size may vary according to the user device task, such as small file downloads (e.g., web browsing, etc.) versus large file downloads (e.g., video streaming, etc.), file size may be a hidden variable that dominates the policy, causing it to fail. Other hidden variables may include server behavior, user device behavior, and network congestion.

Figure 4C:
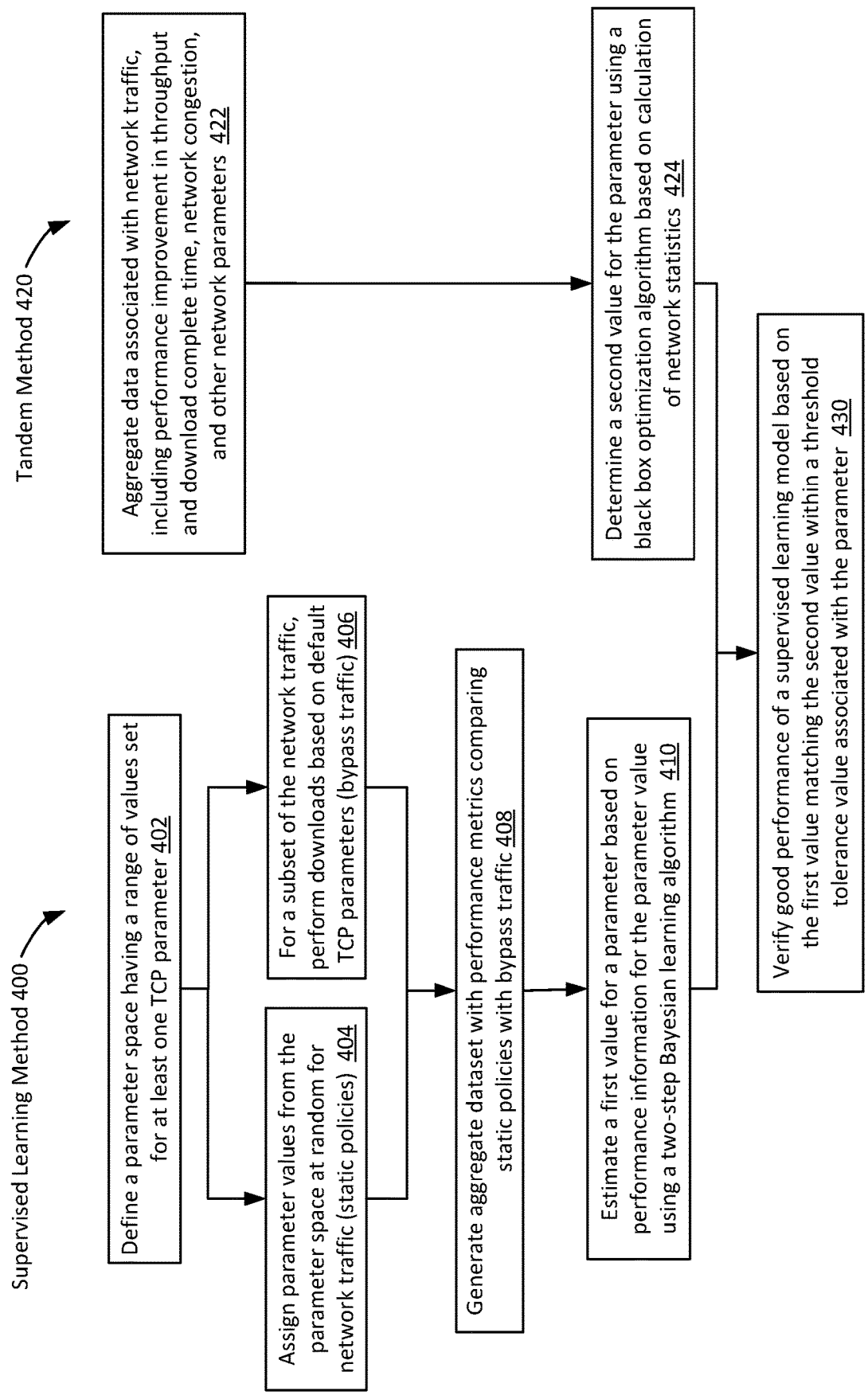
FIG. 4C illustrates a flowchart for adaptive network policy optimization, according to an embodiment of the invention.

FIG. 4C illustrates a flowchart for adaptive network policy optimization, according to an embodiment of the invention. Supervised Learning Method 400, using the supervised machine learning trainer 214 and data model generator 208, among other components in the adaptive network performance optimizer 106 as described above, may be used in adaptive network policy optimization for a scope or a sub scope, in an embodiment. A parameter space having a range of values set for at least one network or TCP parameter may be defined 402. This parameter space may be defined 402 based on known information and/or heuristics, for example. Parameter values from the parameter space may be assigned 404 at random or uniformly for network traffic (static policies). For a subset of the network traffic, downloads may be performed 406 based on default network or TCP parameters (bypass traffic). As mentioned above, raw network traffic data may be gathered over time according to the randomly assigned network or TCP parameters or default network or TCP parameters.

An aggregate dataset may be generated 408 to have performance metrics comparing static policies with bypass traffic. Each data point in the aggregate dataset is an aggregation of the values recorded for a particular combination of network or TCP parameter and time block. Additionally, the distribution of control field values (each combination of network or TCP parameter and time block) in the aggregate data set is representative of the mobile network traffic being optimized due to the method of generation.

A data matrix may be generated based on aggregate datasets or database records that are in turn generated from static policy data and the bypass traffic data. Every network or TCP parameter to be used by an individual customized strategy specifically optimized for a scope or sub scope may be modeled as an inverse problem: a function of the download outcomes.

A first parameter value for a network or TCP parameter in the individual customized strategy may be estimated 410 based on performance information using a two-step Bayesian learning algorithm. In a tandem method 420, data associated with network traffic, including performance improvement in throughput and download complete time, network congestion, and other network parameters, may be aggregated 422. This data associated with network traffic may be used to determine 424 a second parameter value for the network or TCP parameter using a black box optimization algorithm that maximizes performance based on the calculation of network statistics.

Good performance of a supervised learning algorithm, method 400, or model may be verified 430 based on the first parameter value for the network or TCP parameter matching the second parameter value for the same network or TCP parameter within a threshold tolerance value associated with the network or TCP parameter. Network or TCP parameters may be associated with different threshold tolerance values. For example, a threshold tolerance value for a continuous network or TCP parameter, such as transmission rate, may be 10%, meaning that the first network or TCP parameter value should be within 10% of the second network or TCP parameter value. If the model is not verified 430, the supervised learning method 400 and tandem method 420 may repeat until the model converges.

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However, there is a lot of information about the network available in the transit traffic itself—from billions of devices consuming data. This information that describes network operating characteristics and defines efficacy of data delivery strategies is called a "network imprint". The approaches described herein allow embodiments to compute this network imprint. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

Figure 4D:
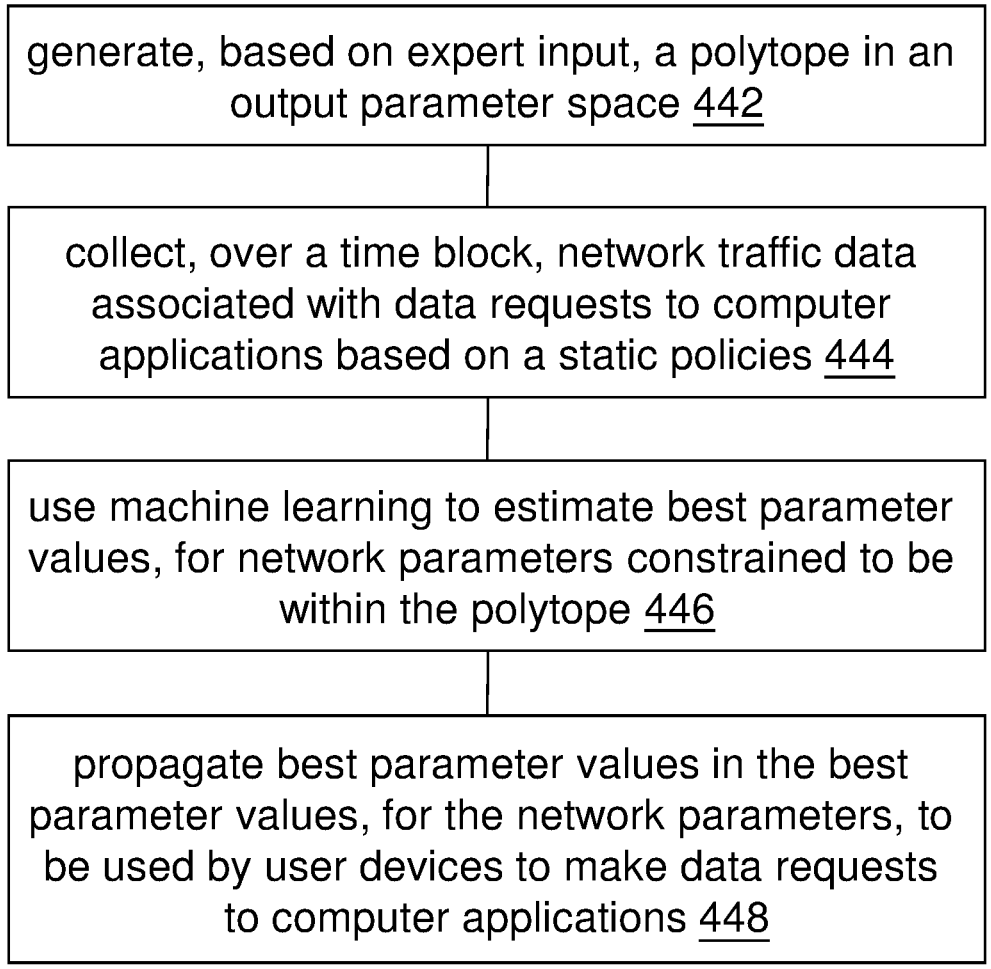

FIG. 4D illustrates a computer implemented method comprising: a block 442 of generating, based on expert input, a polytope in an output parameter space, the polytope constraining a set of network parameters to one or more value ranges that are a subset of possible parameter values represented in the output parameter space; a block 444 of collecting, over a time block, network traffic data associated with a plurality of data requests to one or more computer applications based on a plurality of static policies, each static policy in the plurality of static policies comprising parameter values, for network parameters in the set of network parameters, that are constrained to be within the polytope; a block 446 of using machine learning to estimate best parameter values, for the network parameters in the set of network parameters, that are constrained to be within the polytope; a block 448 of propagating one or more best parameter values in the best parameter values, for the network parameters in the set of network parameters, to be used by one or more user devices to make one or more new data requests to the one or more computer applications. FIG. 4E illustrates a computer implemented method comprising: blocks 442 through 448 of FIG. 4D; a further block 450 of verifying the best parameter values, for the network parameters in the set of network parameters, by comparing to parameter values determined from a black box optimization.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
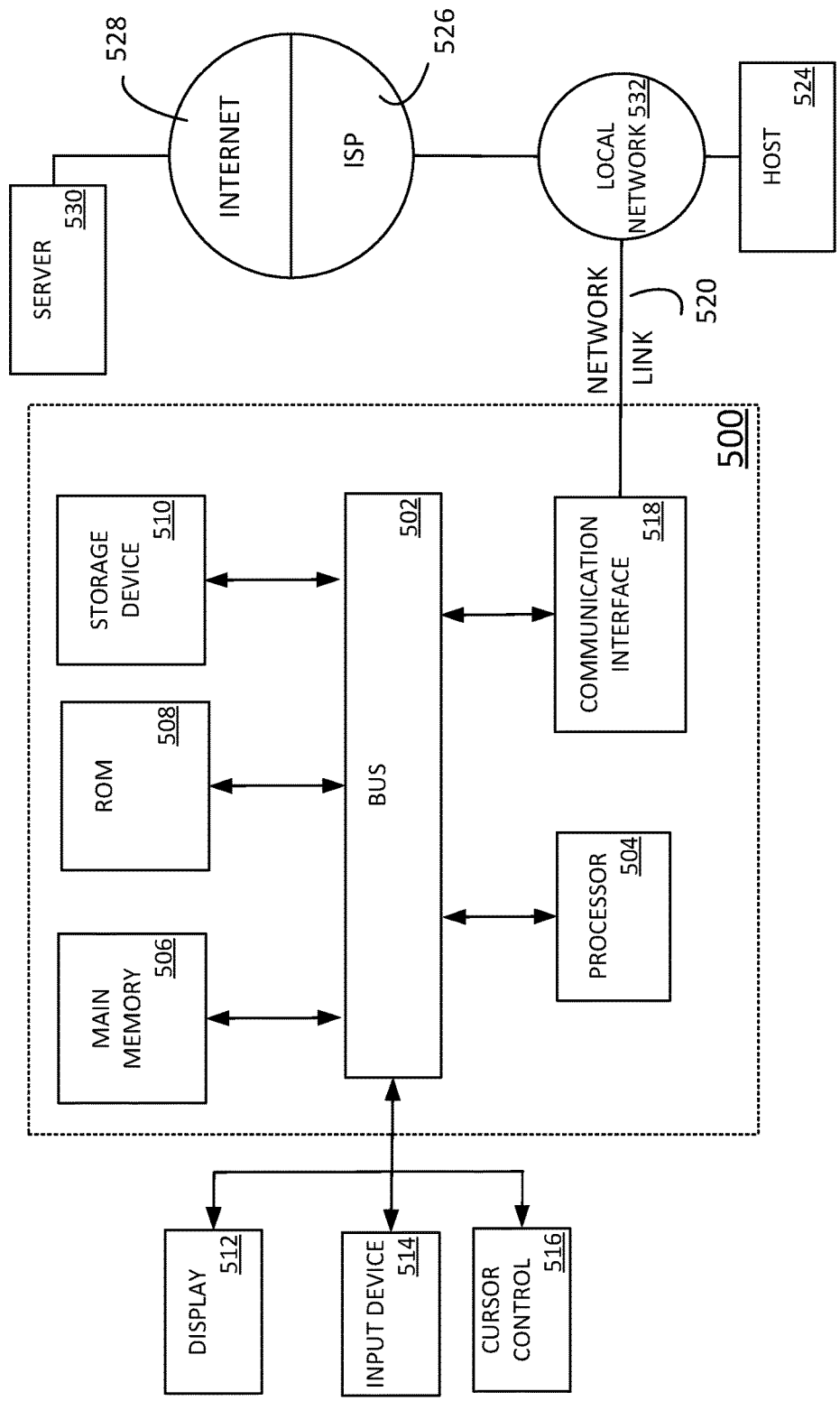
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   constraining, based on expert input comprising recommended parameter values provided by one or more human experts, a machine learning framework using a specific learning iteration to perform machine learning to estimate a set of optimal parameter values for a set of Transmission Control Protocol (TCP) parameters in one or more specific regions of an output parameter space, wherein the output parameter space represents a space of all possible parameter values for the set of TCP parameters;
   collecting, over a time block, network traffic data associated with a plurality of data requests to one or more computer applications based on a plurality of sets of sampled parameter values for the set of TCP parameters, wherein the plurality of sets of sampled parameter values are distributed within the one or more specific regions of the output parameter space;
   using the machine learning to estimate the set of optimal parameter values for the set of TCP parameters;
   propagating one or more optimal parameter values in the set of optimal parameter values, for the set of TCP parameters, to be used by one or more user devices to make one or more new data requests to the one or more computer applications.

2. The method as recited in claim 1, wherein the one or more specific regions of an output parameter space represent a constraint to be specifically applied to a data request segment in a data request space that represents a space of all possible data requests, wherein the data request space comprises one or more data request segments, and wherein each data request segment in the one or more data request segments comprise data requests with a common set of values for the set of TCP parameters.

3. The method as recited in claim 2, wherein the expert input identifies the data request segment in the data request space, with constrained values for one or more parameters in the set of TCP parameters, represented in a data matrix aggregated from the network traffic data.

4. The method as recited in claim 1, wherein the one or more optimal parameter values for the set of TCP parameters are propagated to be used by the one or more user devices to make the one or more new data requests to the one or more computer applications in response to determining that a network strategy with the one or more optimal parameter values for the set of TCP parameters satisfies one or more of: a confidence criterion or a statistical significance criterion.

5. The method as recited in claim 1, wherein the one or more optimal parameter values for the set of TCP parameters are estimated using a data model that is trained based at least in part on the network traffic data.

6. The method as recited in claim 1, wherein the expert input is provided as configurable parameter values in a configuration file accessed by the machine learning framework that performs the machine learning.

7. The method as recited in claim 1, further comprising:
verifying the one or more optimal parameter values for the set of TCP parameters by comparing to parameter values computed through optimizing an objective function that depends at least in part on throughput and download complete time.

8. A non-transitory computer readable medium storing a set of computer instructions which, when executed by one or more computer processors, causes the one or more computer processors to perform:
constraining, based on expert input comprising recommended parameter values provided by one or more human experts, a machine learning framework using a specific learning iteration to perform machine learning to estimate a set of optimal parameter values for a set of Transmission Control Protocol (TCP) parameters in one or more specific regions of an output parameter space, wherein the output parameter space represents a space of all possible parameter values for the set of TCP parameters;
collecting, over a time block, network traffic data associated with a plurality of data requests to one or more computer applications based on a plurality of sets of sampled parameter values for the set of TCP parameters, wherein the plurality of sets of sampled parameter values are distributed within the one or more specific regions of the output parameter space;
using the machine learning to estimate the set of optimal parameter values for the set of TCP parameters;
propagating one or more optimal parameter values in the set of optimal parameter values, for the set of TCP parameters, to be used by one or more user devices to make one or more new data requests to the one or more computer applications.

9. The non-transitory computer readable medium as recited in claim 8, wherein the one or more specific regions of an output parameter space represent a constraint to be specifically applied to a data request segment in a data request space that represents a space of all possible data requests, wherein the data request space comprises one or more data request segments, and wherein each data request segment in the one or more data request segments comprise data requests with a common set of values for the set of TCP parameters.

10. The non-transitory computer readable medium as recited in claim 9, wherein the expert input identifies the data request segment in the data request space, with constrained values for one or more parameters in the set of TCP parameters, represented in a data matrix aggregated from the network traffic data.

11. The non-transitory computer readable medium as recited in claim 8, wherein the one or more optimal parameter values for the set of TCP parameters are propagated to be used by the one or more user devices to make the one or more new data requests to the one or more computer applications in response to determining that a network strategy with the one or more optimal parameter values for the set of TCP parameters satisfies one or more of: a confidence criterion or a statistical significance criterion.

12. The non-transitory computer readable medium as recited in claim 8, wherein the one or more optimal parameter values for the set of TCP parameters are estimated using a data model that is trained based at least in part on the network traffic data.

13. The non-transitory computer readable medium as recited in claim 8, wherein the expert input is provided as configurable parameter values in a configuration file accessed by the machine learning framework that performs the machine learning.

14. The non-transitory computer readable medium as recited in claim 8, wherein the set of computer instructions which, when executed by the one or more computer processors, causes the one or more computer processors to further perform:
verifying the one or more optimal parameter values for the set of TCP parameters by comparing to parameter values computed through optimizing an objective function that depends at least in part on throughput and download complete time.

15. An apparatus, comprising:
one or more computer processors;
a non-transitory computer-readable medium storing a set of computer instructions which, when executed by the one or more computer processors, causes the one or more computer processors to perform:
constraining, based on expert input comprising recommended parameter values provided by one or more human experts, a machine learning framework using a specific learning iteration to perform machine learning to estimate a set of optimal parameter values for a set of Transmission Control Protocol (TCP) parameters in one or more specific regions of an output parameter space, wherein the output parameter space represents a space of all possible parameter values for the set of TCP parameters;
collecting, over a time block, network traffic data associated with a plurality of data requests to one or more computer applications based on a plurality of sets of sampled parameter values for the set of TCP parameters, wherein the plurality of sets of sampled parameter values are distributed within the one or more specific regions of the output parameter space;
using the machine learning to estimate the set of optimal parameter values for the set of TCP parameters;
propagating one or more optimal parameter values in the set of optimal parameter values, for the set of TCP parameters, to be used by one or more user devices to make one or more new data requests to the one or more computer applications.

16. The apparatus as recited in claim 15, wherein the one or more specific regions of an output parameter space represent a constraint to be specifically applied to a data request segment in a data request space that represents a space of all possible data requests, wherein the data request space comprises one or more data request segments, and wherein each data request segment in the one or more data request segments comprise data requests with a common set of values for the set of TCP parameters.

17. The apparatus as recited in claim 15, wherein the one or more optimal parameter values for the set of TCP parameters are propagated to be used by the one or more user devices to make the one or more new data requests to the one or more computer applications in response to determining that a network strategy with the one or more optimal parameter values for the set of TCP parameters satisfies one or more of: a confidence criterion or a statistical significance criterion.

18. The apparatus as recited in claim 15, wherein the one or more optimal parameter values for the set of TCP parameters are estimated using a data model that is trained based at least in part on the network traffic data.

19. The apparatus as recited in claim 15, wherein the expert input is provided as configurable parameter values in a configuration file accessed by the machine learning framework that performs the machine learning.

20. The apparatus as recited in claim 15, wherein the set of computer instructions which, when executed by the one or more computer processors, causes the one or more computer processors to further perform:
- verifying the one or more optimal parameter values for the set of TCP parameters by comparing to parameter values computed through optimizing an objective function that depends at least in part on throughput and download complete time.

* * * * *